United States Patent
Lan et al.

(10) Patent No.: US 11,665,340 B2
(45) Date of Patent: May 30, 2023

(54) SYSTEMS AND METHODS FOR HISTOGRAM-BASED WEIGHTED PREDICTION IN VIDEO ENCODING

(71) Applicant: Meta Platforms, Inc., Menlo Park, CA (US)

(72) Inventors: Junqiang Lan, Fremont, CA (US); Guogang Hua, San Ramon, CA (US); Harikrishna Madadi Reddy, San Jose, CA (US); Chung-Fu Lin, Campbell, CA (US); Xing Cindy Chen, Los Altos, CA (US); Sujith Srinivasan, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/558,276

(22) Filed: Dec. 21, 2021

(65) Prior Publication Data

US 2022/0303525 A1    Sep. 22, 2022

Related U.S. Application Data

(60) Provisional application No. 63/163,952, filed on Mar. 22, 2021.

(51) Int. Cl.
*H04N 19/105* (2014.01)
*H04N 19/172* (2014.01)
(Continued)

(52) U.S. Cl.
CPC ......... *H04N 19/105* (2014.11); *H04N 19/172* (2014.11); *H04N 19/196* (2014.11); *H04N 19/51* (2014.11)

(58) Field of Classification Search
CPC .... H04N 19/00; H04N 19/105; H04N 19/172; H04N 19/196; H04N 19/51
See application file for complete search history.

(56) References Cited

U.S. PATENT DOCUMENTS

| | | | |
|---|---|---|---|
| 11,057,558 B2 * | 7/2021 | Tiwari | H04N 5/23222 |
| 2003/0231797 A1 * | 12/2003 | Cullen | G06T 9/005 |
| | | | 375/E7.153 |

(Continued)

FOREIGN PATENT DOCUMENTS

WO    2009033152 A2    3/2009

OTHER PUBLICATIONS

Bordes (Technicolor) P: "Weighted Prediction," 6. JCT-VC Meeting, Jul. 14, 2011-Jul. 22, 2011, Torino, (Joint Collaborative Team on Videocoding of ISO/IEC JTC1/SC29/WG11 and ITU-TSG.16), Jul. 18, 2011, 14 pages, Retrieved from the Internet: URL: https://www.itu.int/wftp3/av-arch/jctvc-site/2011_07_F_Torino/JCTVC-F265-v5.zip.

(Continued)

*Primary Examiner* — Kyle M Lotfi
(74) *Attorney, Agent, or Firm* — Greenberg Traurig, LLP

(57) ABSTRACT

A disclosed computer-implemented method may include (1) selecting, from a video stream, a reference frame and a current frame, (2) collecting a reference histogram of the reference frame and a current histogram of the current frame, and (3) generating a smoothed reference histogram by applying a smoothing function to at least a portion of the reference histogram. In some examples, the computer-implemented method may also include (1) determining a similarity metric between the smoothed reference histogram and the current histogram and, (2) when the similarity metric is greater than a threshold value, applying weighted prediction during a motion estimation portion of an encoding of the (Continued)

video stream. Various other methods, systems, and computer-readable media are also disclosed.

20 Claims, 6 Drawing Sheets

(51) Int. Cl.
*H04N 19/196* (2014.01)
*H04N 19/51* (2014.01)

(56) References Cited

U.S. PATENT DOCUMENTS

| | | | |
|---|---|---|---|
| 2009/0067504 A1* | 3/2009 | Zheludkov | H04N 19/56 375/E7.262 |
| 2014/0153797 A1* | 6/2014 | Wan | G06T 3/0068 382/128 |
| 2015/0125030 A1* | 5/2015 | Suzuki | A61B 5/441 382/103 |
| 2019/0272643 A1* | 9/2019 | Gadgil | G06T 5/50 |
| 2021/0097327 A1* | 4/2021 | Pan | H04N 19/182 |

OTHER PUBLICATIONS

Extended European Search Report for European Application No. 22162851.4, dated Aug. 18, 2022, 6 pages.

* cited by examiner

SYSTEMS AND METHODS FOR HISTOGRAM-BASED WEIGHTED PREDICTION IN VIDEO ENCODING

CROSS REFERENCE TO RELATED APPLICATION

This application claims the benefit of U.S. Provisional Application No. 63/163,952, filed Mar. 22, 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
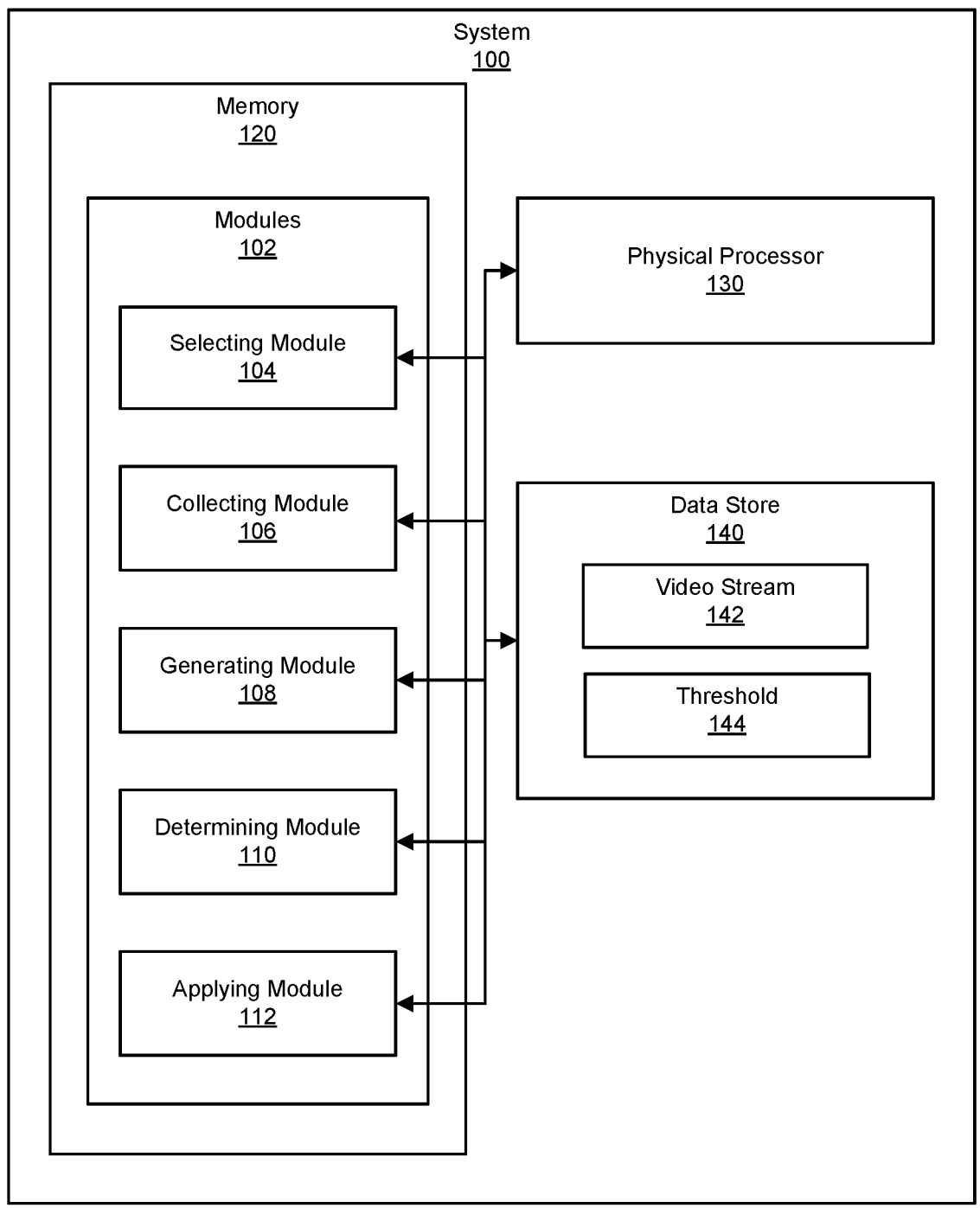
FIG. 1 is a block diagram of an example system for histogram-based weighted prediction in video encoding.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Various platforms, services, and software may implement and/or employ video encoding solutions to transcode video files and/or streams having one set of encoding parameters (e.g., resolution, bit depth, frame rate, quality, etc.) to another video file and/or stream having another set of encoding parameters. Some video encoding solutions may seek to improve encoding efficiency by identifying or predicting video scenes with luminance variations such as fades or lighting changes. Unfortunately, conventional methods of identifying or predicting scenes with luminance variations may inaccurately identify or predict such scenes. Additionally, some conventional methods may employ computationally complex methods that may not scale well to higher resolutions and/or bitrates. Hence, the instant application identifies and addresses a need for additional systems and methods for identifying and/or predicting luminance changes in video streams.

The present disclosure is generally directed to systems and methods for histogram-based weighted prediction in video encoding. As will be explained in greater detail below, embodiments of the instant disclosure may select, from a video stream, a reference frame and a current frame. In some examples, one or more of the systems described herein may select the reference frame and the current frame during a motion estimation portion of an encoding of the video stream.

An embodiment may also collect a reference histogram of the reference frame and a current histogram of the current frame and, in some examples, may apply a determined weight and/or offset value to the reference histogram. The embodiment may further generate a smoothed reference histogram by applying a smoothing function to at least a portion of the reference histogram. The embodiment may also determine a similarity metric between the smoothed reference histogram and the current histogram. In some examples, determining the similarity metric may include determining a correlation coefficient (e.g., a Pearson correlation) between the smoothed reference histogram and the current histogram.

Furthermore, in some embodiments, when the determined similarity metric is greater than a threshold value, the systems and methods described herein may apply weighted prediction during a motion estimation portion of an encoding of the video stream.

The systems and methods described herein may have many benefits over conventional video encoding systems and/or methods. Conventional video encoding systems may have difficulty efficiently encoding portions of video files or streams that include fade-out-to-black or fade-in-from-black portions, as such portions may cause conventional video encoding systems to generate, calculate, or observe high motion estimation and/or prediction error. To alleviate some of this difficulty, some video encoding standards (e.g., H.264, H.265, etc.) may include tools for weighted prediction during a motion estimation portion of an encoding of a video stream. Conventional weighted prediction techniques may use a multiplicative weighting factor and an additive offset applied to the motion compensation prediction to improve coding efficiency during such scenes. (e.g., fades).

However, conventional weighting/offset methods can indicate "false alarms" in that they may incorrectly indicate that a global luminance/lighting change occurs between two frames where no global luminance/lighting change actually occurs between the two frames. The systems and methods described herein may rule out such false alarms, thereby improving video encoding efficiency and/or quality. Furthermore, conventional weighting/offset methods may involve n multiplications (where n may be a number of pixels in the frame) and/or computation of an absolute difference for a whole frame. The systems and methods described herein may omit or limit such operations, and hence may be considerably more efficient (e.g., computationally efficient, energy efficient, temporally efficient, etc.) than conventional weighting/offset methods.

By way of illustration, in an H.264 video encoding process, a constant weight factor and an offset may be applied on a reference picture (e.g., frame, slice, group of pictures, etc.) in a motion estimation portion of an encoding process. Explicit weighted prediction may be efficient when encoding video scenes with luminance variations. In this example, a weight/offset pair may be included as part of a slice header per YUV component. Theoretically, the weight/offset may be derived based on an energy change between a current frame and a reference frame in accordance with $$W = \frac{\sigma(X_i)}{\sigma(X_p)} \quad (1)$$

$$O = \text{mean}(X_i) - W * \text{mean}(X_p)$$

where p is a reference frame, i is a current frame, mean(X) is the mean value of one frame, σ(X) is a variance of one frame, W is a weight, and O is an offset.

However, non-default weight/offset values (e.g., W is not 1 or O is not 0) are often false alarms in that there may be no global luminance/lighting changes between the two frames. Some implementations of the H.264 standard (e.g., the open-source X264 codec) may use a real motion compensation loop to rule out these false alarms and refine the weight/offset. A real motion compensation loop may calculate a real cost of [W−1, W+1]×[O−1, O+1] on an entire frame and compare it with (W=1, O=0). The weight/offset with minimum cost C is kept in accordance with $$C(W,O) = \Sigma |X_i - W * X_p - O| \quad (2)$$

in which the sum may represent a summation of all pixels on the whole frame. This may involve n multiplications (where n may be a number of pixels in the frame) and/or computation of an absolute difference for all pixels in a frame. Hence, a light-weight histogram-based method such as described herein may be considerably more efficient than the weight/offset methods described in this example.

The following will provide, with reference to FIGS. 1-2 and 4-6, detailed descriptions of systems for histogram-based weighted prediction in video encoding. Detailed descriptions of corresponding computer-implemented methods will also be provided in connection with FIG. 3.

FIG. 1 is a block diagram of an example system 100 for histogram-based weighted prediction in video encoding. As illustrated in this figure, example system 100 may include one or more modules 102 for performing one or more tasks. As will be explained in greater detail below, modules 102 may include a selecting module 104 that selects, from a video stream (e.g., a video stream 142), a reference frame and a current frame. Example system 100 may also include a collecting module 106 that may collect a reference histogram of the reference frame and a current histogram of the current frame and a generating module 108 that may generate a smoothed reference histogram by applying a smoothing function to at least a portion of the reference histogram.

In some embodiments, example system 100 may also include a determining module 110 that may determine a similarity metric between the smoothed reference histogram and the current histogram. Additionally, example system 100 may also include an applying module 112 that may, when the determined similarity metric is greater than a threshold value, apply weighted prediction during a motion estimation portion of an encoding of the video stream.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate histogram-based weighted prediction in video encoding. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 1, example system 100 may further include one or more data stores, such as data store 140, that may receive, store, and/or maintain data. Data store 140 may represent portions of a single data store or computing device or a plurality of data stores or computing devices. In some embodiments, data store 140 may be a logical container for data and may be implemented in various forms (e.g., a database, a file, a file system, a data structure, etc.). Examples of data store 140 may include, without limitation, files, file systems, data stores, databases, and/or database management systems such as an operational data store (ODS), a relational database, a No SQL database, a NewSQL database, and/or any other suitable organized collection of data.

In at least one example, data store 140 may include (e.g., store, host, access, maintain, etc.) video stream 142 and/or a threshold 144. As will be explained in greater detail below, in some examples, video stream 142 may include and/or represent any video file and/or video stream. In some examples, video stream 142 may include, represent, and/or constitute a video object, such as one or more frames, pixels, slices, groups of pictures (GOPs), shots, scenes, and so forth. In some examples, video stream 142 may be encoded by an encoding operation and/or decoded by a decoding operation. Further, video stream 142 may be transcoded by a transcoding operation (e.g., a combination of encoding and decoding operations). Additionally or alternatively, video stream 142 may include any suitable metadata. Further, one or more video objects included within video stream 142 may have any suitable attributes or features, such as a resolution, a bitrate, an encoding/decoding standard (e.g., a codec) and so forth. Moreover, in some examples, threshold 144 may include or represent any suitable threshold of a metric that may describe a degree of similarity of one histogram to another.

Figure 2:
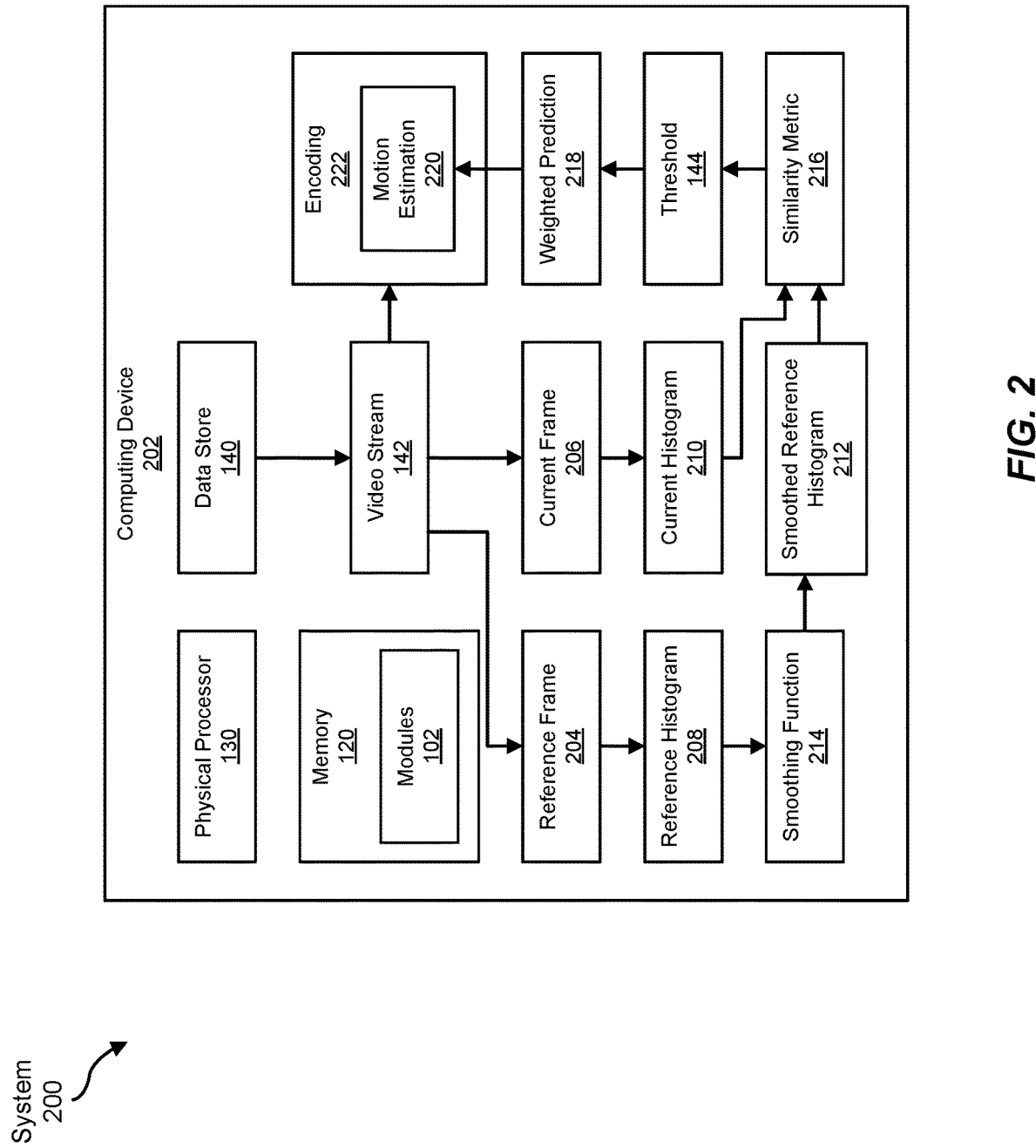
FIG. 2 is a block diagram of an example implementation of a system for histogram-based weighted prediction in video encoding.

Example system 100 in FIG. 1 may be implemented in a variety of ways. For example, all or a portion of example system 100 may represent portions of an example system 200 ("system 200") in FIG. 2. As shown in FIG. 2, example system 200 may include a computing device 202. In at least one example, computing device 202 may be programmed with one or more of modules 102.

In at least one embodiment, one or more modules 102 from FIG. 1 may, when executed by computing device 202, enable computing device 202 to perform one or more operations for histogram-based weighted prediction in video encoding. For example, as will be described in greater detail below, selecting module 104 may cause computing device 202 to select, from a video stream (e.g., 142), a reference frame (e.g., reference frame 204) and a current frame (e.g., current frame 206). Additionally, collecting module 106 may cause computing device 202 to collect a reference histogram (e.g., reference histogram 208) of the reference frame and a current histogram (e.g., current histogram 210) of the current frame. Furthermore, generating module 108 may cause computing device 202 to generate a smoothed reference histogram (e.g., smoothed reference histogram 212) by applying a smoothing function (e.g., smoothing function 214) to at least a portion of the reference histogram.

In some examples, determine a similarity metric (e.g., similarity metric 216) between the smoothed reference histogram and the current histogram. When the determined similarity metric is less than a threshold value (e.g., threshold 144), apply weighted prediction (e.g., weighted prediction 218) during a motion estimation (e.g., motion estimation 220) portion of an encoding (e.g., encoding 222) of the video stream.

Computing device 202 generally represents any type or form of computing device capable of reading and/or executing computer-executable instructions and/or hosting executables. Examples of computing device 202 may include, without limitation, application servers, storage servers, database servers, web servers, and/or any other suitable computing device configured to run certain software applications and/or provide various application, storage, and/or database services.

In at least one example, computing device 202 be a computing device programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 to perform histogram-based weighted prediction in video encoding.

Many other devices or subsystems may be connected to example system 100 in FIG. 1 and/or example system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Example systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
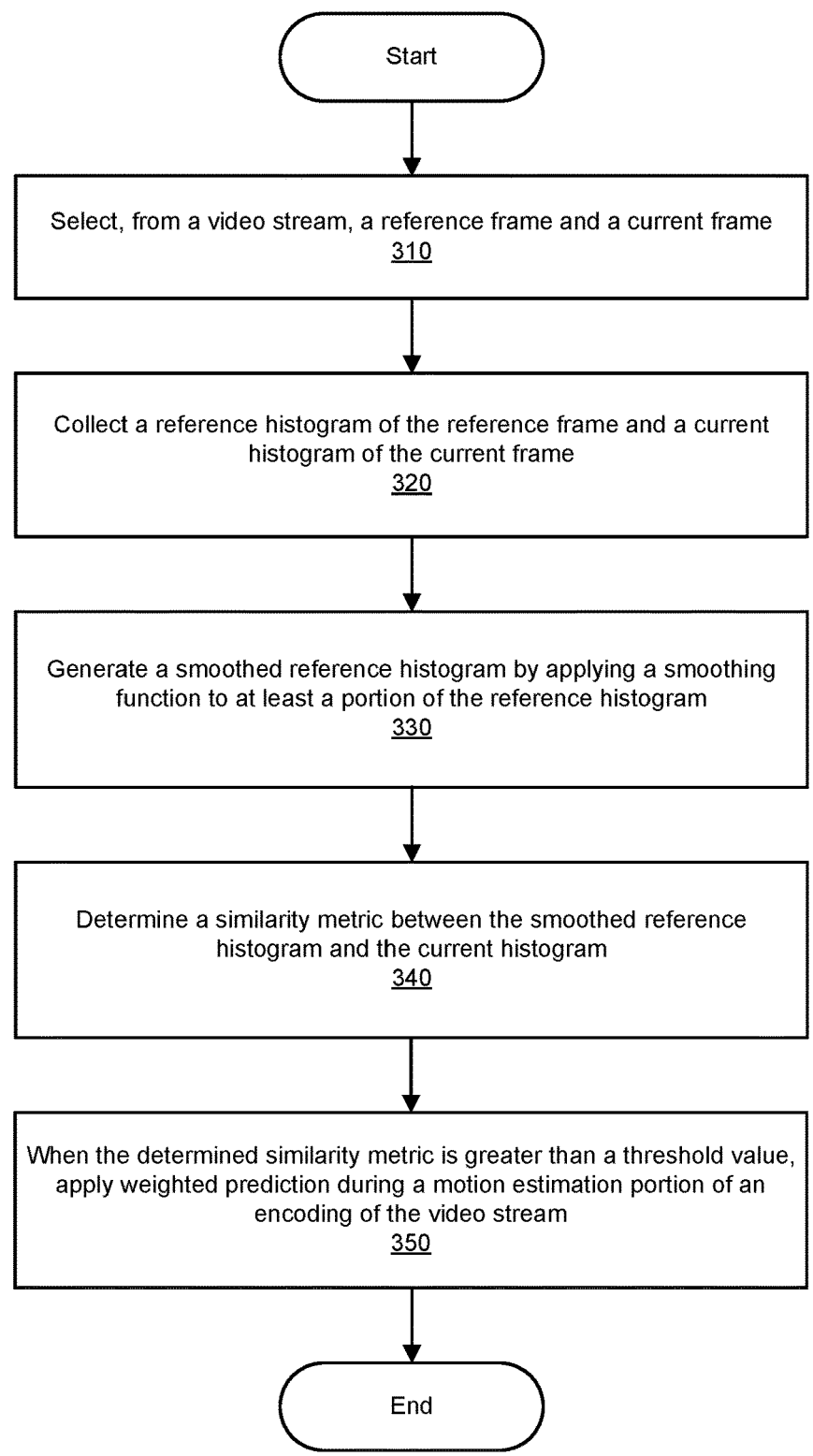
FIG. 3 is a flow diagram of an example method for histogram-based weighted prediction in video encoding.

FIG. 3 is a flow diagram of an example computer-implemented method 300 for allocating shared resources in multi-tenant environments. The steps shown in FIG. 3 may be performed by any suitable computer-executable code and/or computing system, including example system 100 in FIG. 1, example system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may select, from a video stream, a reference frame and a current frame. For example, selecting module 104 may, as part of computing device 202, cause computing device 202 to select, from video stream 142, a reference frame 204 and a current frame 206.

Note the terms "reference" and "current" as used herein are generally intended to distinguish one item (e.g., a frame, a histogram, a smoothed histogram, etc.) from another, and do not express, suggest, or imply any particular temporal, physical, logical, or other relationship between items herein except where expressly indicated. As an illustration, the terms "reference frame" and "current frame" may refer to any distinct frames, slices, pictures, and so forth (or, in some examples, the same frame, slice, picture, etc.) within a video stream. Unless expressly stated, terms such as "the reference frame may precede the current frame," "the current frame may precede the reference frame," "the reference frame may follow the current frame," and so forth, including visual depictions of such within the accompanying drawings, are included merely for illustrative purposes and are not intended to limit the scope of this disclosure to any particular temporal, physical, logical, or other relationship between a reference frame and a current frame.

Selecting module 104 may select reference frame 204 and current frame 206 from video stream 142 in any suitable way. For example, selecting module 104 may select reference frame 204 and current frame 206 during a motion estimation portion of an encoding of video stream 142. For example, computing device 202 may execute an encoding operation to encode video stream 142 in accordance with an encoding standard that includes a motion estimation portion or feature, such as H.264, H.265, and so forth. Selecting module 104 may cause computing device 202 to select reference frame 204 and current frame 206 from video stream 142 during the motion estimation portion of the encoding operation.

Returning to FIG. 3, at step 320, one or more of the systems described herein may collect a reference histogram of the reference frame and a current histogram of the current frame. For example, collecting module 106 may, as part of computing device 202, cause computing device 202 to collect a reference histogram 208 of reference frame 204 and a current histogram 210 of current frame 206.

In some examples, a histogram may represent or approximate any distribution of data by dividing a range of values into a series of intervals and then by counting how many values fall into each interval. A graph (e.g., a line graph, a bar graph, etc.) may be one way to represent a histogram. Another way of representing a histogram may be by charting or graphing a density function that represents a smooth curve that fits the data included in the histogram. Examples of histograms and/or smoothed histograms are provided below in reference to FIGS. 4 and 5.

In a more general mathematical sense, a histogram may be a function $m_i$ that counts a number of observations that fall into each of a set of disjoint categories (known as bins). Thus, if we let n be a total number of observations and k be a total number of bins, a histogram $m_i$ may meet the following conditions:

$$n = \sum_{i=1}^{k} m_i \tag{3}$$

A histogram of a digital image or a frame of a digital video stream may show a distribution of a value of an attribute of a set of pixels included in the image or frame, such as contrast, brightness, color information, tone, and so forth. A horizontal axis of a graphed histogram of an image or frame may represent attribute value (e.g., bins), while a vertical axis may represent a total number of pixels having a particular attribute value. In some examples, a color histogram may represent a distribution of colors in an image or frame, such as a number of pixels in an image or frame that have colors in each of a fixed list of color ranges.

In general, a color histogram may be based on a certain color space, such as RGB, HSV, YUV, and so forth. When we compute the pixels of different colors in an image, if the color space is large, then the color space may be divided into certain numbers of small intervals, where each of the intervals may be referred to as a bin. This process may be referred to as color quantization. A color histogram may be collected by counting a number of pixels in each of the bins.

Collecting module 106 may collect reference histogram 208 and current histogram in a variety of contexts. In simplest terms, collecting module 106 may count the number of pixels for each of a number of entries or scales (e.g., 256 entries or scales) in each of a set of channels of each frame. For example, reference frame 204 may have three channels (e.g., a red channel, a green channel, and a blue channel). Collecting module 106 may collect the pixel values for each pixel in reference frame 204, divide the pixels into each of the corresponding 256 bins, and accumulate the number of pixels in each bin. Note that, while the above example involves red, green, and blue pixel values, the same principles may be applied to images or frames within any suitable color space (e.g., YUV, YPbPr, YCbCr, etc.). Additionally or alternatively, in some examples, a histogram may reflect luminance values of pixels within a frame. Hence, in some examples, collecting module may collect reference histogram 208 (also $H_p$ herein) and current histogram 210 (also $H_i$ herein) by collecting reference histogram 208 from a YUV plane of reference frame 204 and current histogram 210 from a YUV plane of current frame 206.

When correcting for false alarm weights and/or offsets during motion estimation portions of encoding operations, if a weight and offset determined in accordance with an encoder's weight and offset methods (e.g., via equation (1) above for H.264 encoders) truly reflect a global pixel value change from a reference frame to a current frame, the same relationship should stand for histograms of the reference frame and the current frame. By applying the weight/offset on the reference histogram $H_p$, the resultant adjusted histogram $H_{p_1}$ should match the current histogram $H_i$. Hence, in some examples, collecting module 106 may collect reference histogram 208 by determining a weight value (e.g., W) and an offset value (e.g., O) based on reference frame 204 and current frame 206 (e.g., as described above in reference to equation (1) for H.264 encoding), and adjusting reference histogram 208 by applying the weight value and the offset value to reference histogram 208. As will be described in greater detail below, one or more of modules 102 (e.g., determining module 110) may determine a similarity metric (e.g., similarity metric 216) based on the adjusted and/or smoothed reference histogram and the current histogram.

Returning to FIG. 3, at step 330, one or more of the systems described herein may generate a smoothed reference histogram by applying a smoothing function to at least a portion of the reference histogram. For example, generating module 108 may generate smoothed reference histogram 212 by applying smoothing function 214 to at least a portion of reference histogram 208.

Noise on pixel values may introduce sensitivity in histogram metrics. For example, even if two frames are from the same scene, temporal noise may introduce a difference above a predefined threshold on a similarity metric. Smoothing of reference histogram 208 and/or current histogram 210, such as by applying Gaussian smoothing on one or both histograms prior to determining of a similarity metric (e.g., similarity metric 216) between the histograms, may therefore improve robustness of the systems and methods described herein.

In some examples, a smoothing function may include any function, module, method, algorithm, kernel, filter, and so forth that may, when applied to an input histogram, generate a smoothed histogram with a reduced variation in average difference between consecutive bins when compared to the input histogram. In some examples, when a density curve is applied to the input histogram and an additional density curve is applied to the smoothed histogram, the additional density curve of the smoothed histogram may be smoother (e.g., have a lower average magnitude or frequency of variation) than the density curve of the input histogram.

Figure 4:
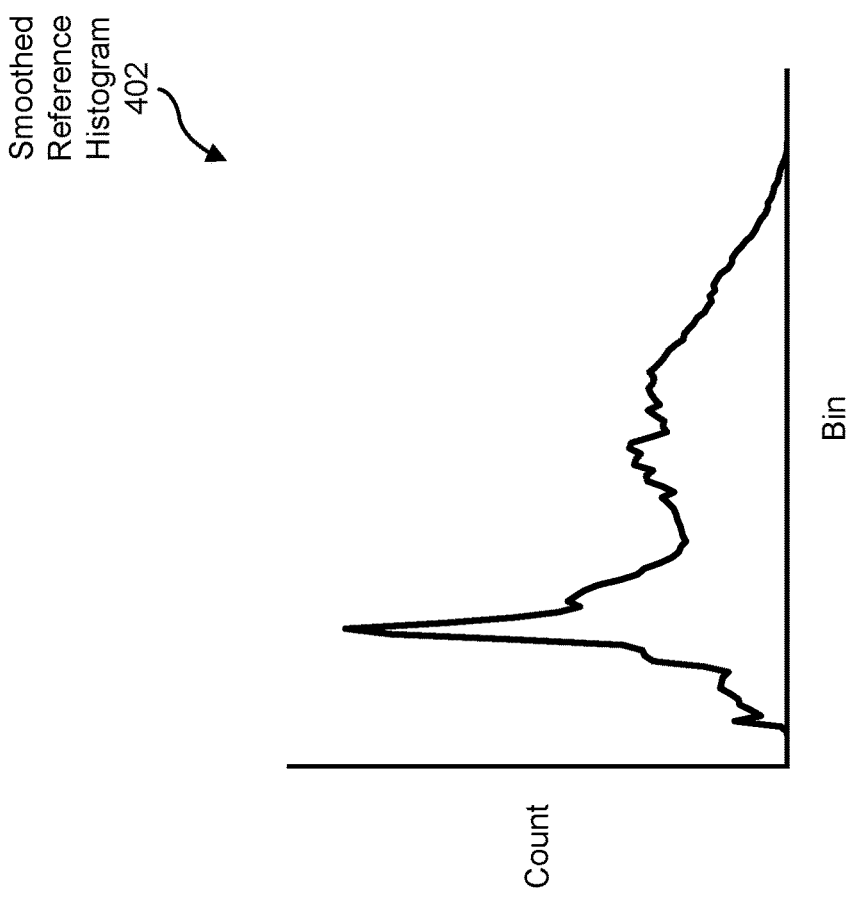
FIG. 4 is a view of a reference histogram and a smoothed reference histogram in accordance with some examples described herein.
Figure 4:
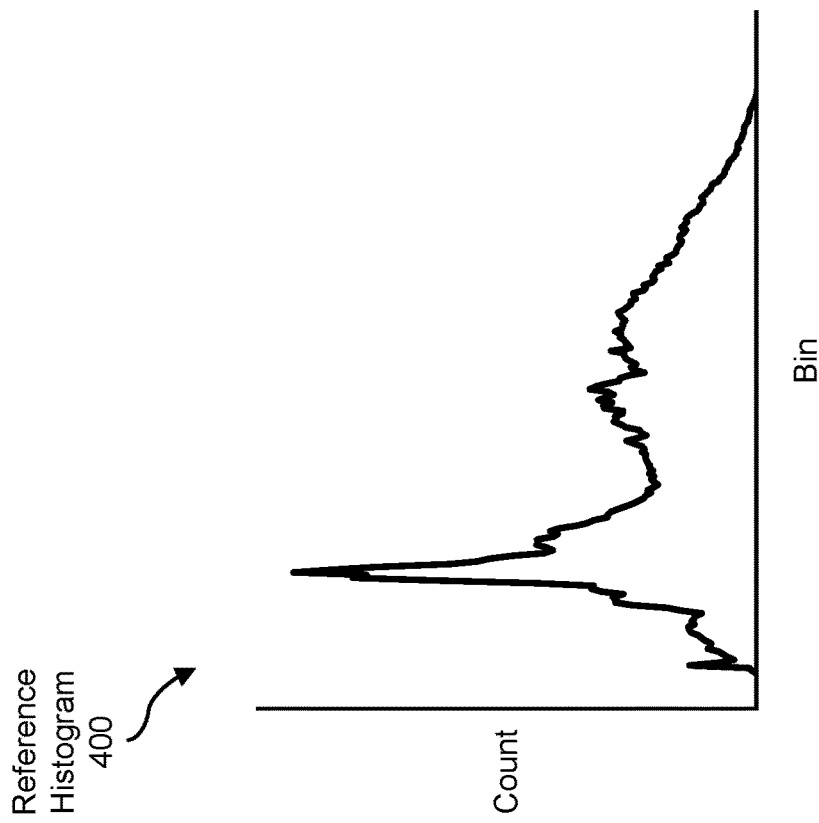

By way of illustration, FIG. 4 shows an example of a reference histogram 400 that one or more of the systems described herein (e.g., collecting module 106) may collect for a reference frame, and a smoothed reference histogram 402 that may be a version of reference histogram 400 that one or more of the systems described herein (e.g., generating module 108) may have generated by applying a smoothing function (e.g., smoothing function 214) to reference histogram 400. As shown, reference histogram 400 and smoothed reference histogram 402 may be plotted density functions that represent or are mapped to data included in reference histogram 400 and smoothed reference histogram 402, respectively.

Figure 5:
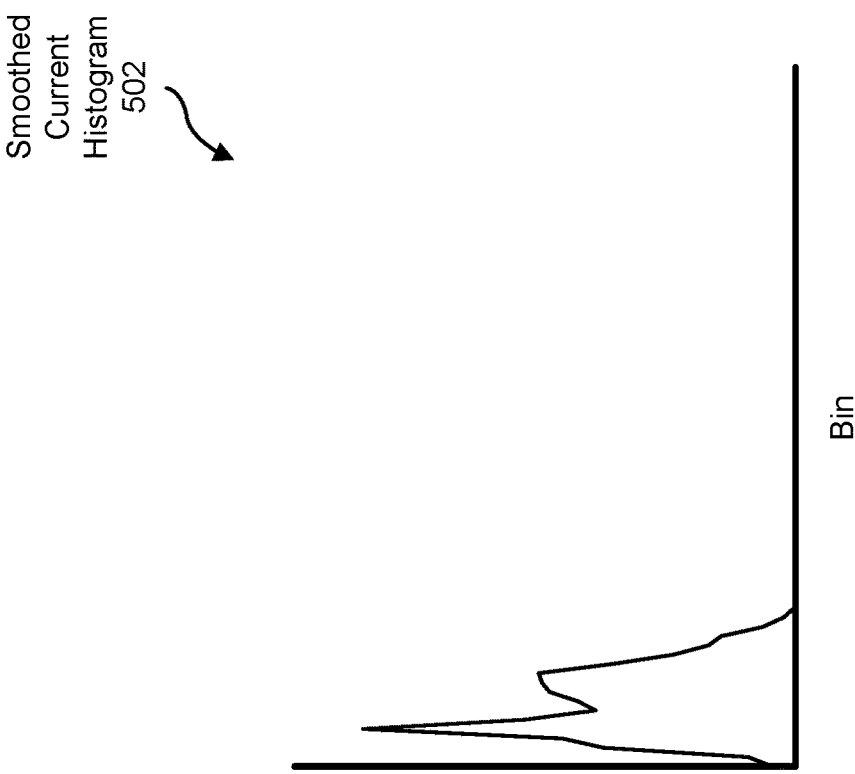
FIG. 5 is a view of a current histogram and a smoothed current histogram in accordance with some examples described herein.
Figure 5:
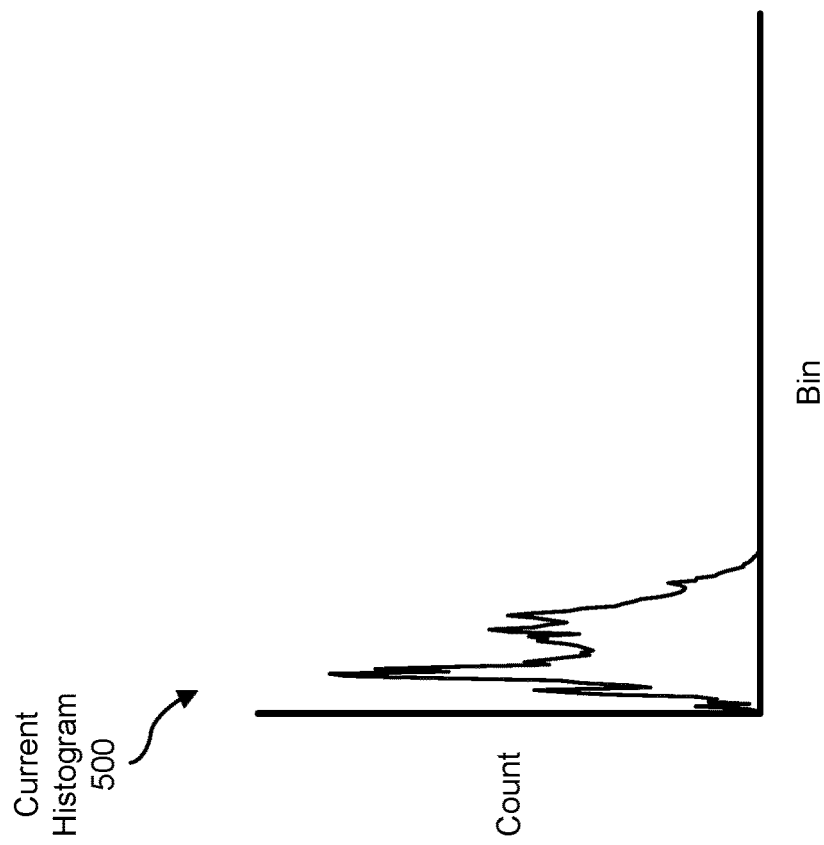

Likewise, FIG. 5 shows an example of a current histogram 500 that one or more of the systems described herein (e.g., collecting module 106) may collect for a current frame, and a smoothed current histogram 502 that may be a version of current histogram 500 that one or more of the systems described herein (e.g., generating module 108) may have generated by applying a smoothing function (e.g., smoothing function 214) to current histogram 500. As shown, current histogram 500 and smoothed current histogram 502 may be plotted density functions that represent or are mapped to data included in current histogram 500 and smoothed current histogram 502, respectively.

Examples of smoothing functions may include, without limitation, Gaussian smoothing functions, nearest-neighbor smoothing functions, wavelet transform functions, barycentric exponential smoothing functions, mean value smoothing functions, and so forth.

Returning to FIG. 3, at step 340, one or more of the systems described herein may determine a similarity metric between the smoothed reference histogram and the current histogram. For example, determining module 110 may cause computing device 202 to determine similarity metric 216 between smoothed reference histogram 212 and current histogram 210.

In some examples, a similarity metric may include any suitable metric that may quantify a difference between a first histogram and a second histogram. As an example, determining module 110 may determine similarity metric 216 between smoothed reference histogram 212 and current histogram 210 by determining a correlation coefficient between smoothed reference histogram 212 and current histogram 210. In some examples, a correlation coefficient may measure a strength of a relationship between two variables, such as smoothed reference histogram 212 and current histogram 210. In some examples, a correlation coefficient of 1 may indicate that for every positive increase in one variable, there may be a positive increase of a fixed proportion in the other. A correlation coefficient of −1 may indicate that, for every positive increase in one variable, there may be a negative decrease of a fixed proportion in the other. A correlation coefficient of 0 may indicate that, for every increase, there is no positive or negative increase.

In some examples, determining module 110 may determine the correlation coefficient by determining a Pearson correlation (e.g., a Pearson correlation between smoothed reference histogram 212 and current histogram 210). A Pearson correlation, as a correlation coefficient, may be a measure of linear correlation between two sets of data (e.g., smoothed reference histogram 212 and current histogram 210). A Pearson correlation may represent a covariance of two variables divided by a product of their standard deviations. Hence, it may be essentially a normalized measurement of the covariance, such that the result may always have a value between −1 and 1. In additional or alternative examples, determining module 110 may determine the correlation coefficient by determining one or more of a mutual information metric, an intraclass correlation (ICC), a polychoric correlation, a rank coefficient, and/or any other suitable correlation coefficient.

Returning to FIG. 3, at step 350, one or more of the systems described herein may, when a determined similarity metric is less than a threshold value, apply weighted prediction during a motion estimation portion of an encoding of a video stream. For example, applying module 112 may, as part of computing device 202, cause computing device 202 to, when similarity metric 216 is less than threshold 144, apply weighted prediction 218 during motion estimation 220 portion of encoding 222 of video stream 142.

By way of illustration, suppose that similarity metric 216 is a correlation coefficient of greater than a threshold value (e.g., 0.1, 0.5, 0.6, 0.7, 1, etc.), which may indicate that smoothed reference histogram 212 may be within a threshold similarity metric of current histogram 210. This may indicate that a weight/offset value determined for the current frame and/or the reference frame truly reflects a global pixel value change on the whole frame, and is not a "false alarm" as described above. Applying module 112 may therefore apply weighted prediction 218 during motion estimation 220. Conversely, suppose that similarity metric 216 is a correlation coefficient of less than a threshold value (e.g., 0.5, 0.1, 0.01, 0, −0.01, −0.1, −0.5, −1, etc.). This may indicate that a weight/offset value determined for the current frame and/or the reference frame is a "false alarm" as described above and applying module 112 may therefore not apply weighted prediction 218 during motion estimation 220.

Figure 6:
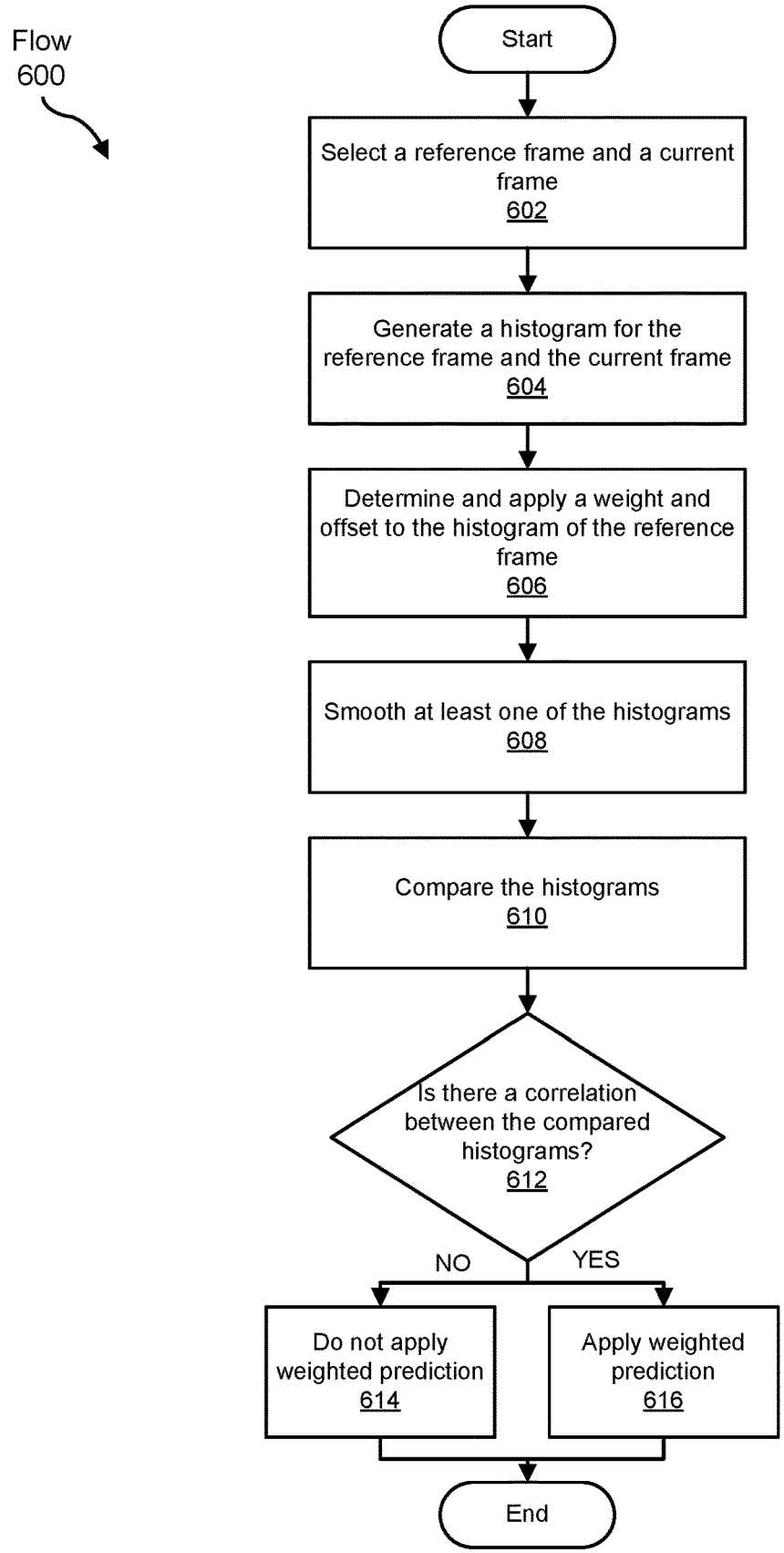
FIG. 6 is an operational flow diagram in accordance with some examples described herein.

FIG. 6 is an operational flow diagram that may illustrate an operational flow 600 of some of the systems and methods described herein. Proceeding from the Start block, at step 602, one or more of the systems described herein (e.g., one or more of modules 102) may select a reference frame and a current frame from a video stream. Continuing to step 604, one or more of the systems described herein (e.g., one or more of modules 102) may generate a histogram for the reference frame and the current frame (e.g., reference histogram 208 and current histogram 210).

At step 606, one or more of the systems described herein (e.g., one or more of modules 102) may apply a predetermined weight and/or offset (e.g., W and/or O) to the histogram of the reference frame (e.g., reference histogram 208), thereby generating an adjusted reference histogram. At step 608, one or more of the systems described herein (e.g., one or more of modules 102) may smooth at least one of the histograms (i.e., generate smoothed reference histogram 212 and/or a smoothed version of current histogram 210).

At step 610, one or more of the systems described herein (e.g., one or more of modules 102) may compare smoothed reference histogram 212 to current histogram 210 and/or a smoothed version of current histogram 210. At choice 612, one or more of the systems described herein (e.g., one or more of modules 102) may determine whether there is a correlation between the compared histograms. If there is no correlation (i.e., the histograms do not match), or the correlation is less than a predetermined threshold, then at alternative 614, one or more of the systems described herein (e.g., one or more of modules 102) may not apply weighted prediction during a motion compensation portion of an encoding of the video stream. If there is a correlation, or the correlation coefficient is greater than the predetermined threshold, then at alternative 616, one or more of the systems described herein (e.g., one or more of modules 102) may apply weighted prediction during the motion compensation portion of the encoding of the video stream.

As discussed throughout the instant disclosure, the disclosed systems and methods may provide one or more advantages over traditional options for video encoding. For example, as described above, conventional video encoding systems may have difficulty efficiently encoding portions of video files or streams that include fade-out-to-black or fade-in-from-black portions. Such portions of video files or streams may cause a conventional video encoding system to generate, calculate, or observe high motion estimation and/or prediction error.

To alleviate some of this difficulty, some video encoding standards (e.g., H.264, H.265, etc.) may include tools for weighted prediction during a motion estimation portion of an encoding of a video stream. However, conventional or traditional weighting/offset methods as applied to motion compensation within video encoding may indicate "false alarms" in that they may indicate that a global luminance/lighting change occurs between two frames where no global luminance/lighting change actually occurs between the two frames. Furthermore, conventional methods for detecting weighting/offset false alarms may involve complex or otherwise computationally intensive operations.

Embodiments of the systems and methods described herein may efficiently rule out such false alarms, thereby improving video encoding efficiency and/or quality. Additionally, the systems and methods described herein may omit or limit complex computing operations, and hence may be considerably more efficient (e.g., computationally efficient, energy efficient, temporally efficient, etc.) than conventional weighting/offset methods. In some examples, the systems and methods described herein may have similar performance to the conventional brute force motion estimation approach, but with negligible computational complexity.

Embodiments of the systems and methods described herein may use a light-weight histogram-based algorithm to rule out false-alarm weight/offset. Embodiments may collect a histogram of each plane (YUV) of a current frame and a reference frame. Each histogram H may have any suitable number of entries, such as 256 entries. The histogram of the current frame and the histogram of the reference frame may be referred to histogram $H_i$ and histogram $H_p$, respectively. If a weight W and offset O, determined in accordance with equation (1) above, truly reflects the global pixel value change on the whole frame, the same relationship should stand for the histogram as well. By applying the weight/Offset on $H_p$, the resultant histogram $H_{p_1}$ should match $H_1$. If this relationship does not hold, embodiments of the systems and methods described herein may determine that the weight and/or offset is a false alarm and may not apply weighted prediction. A possible similarity metric that may indicate a correlation between histogram $H_{p_1}$ and histogram $H_i$ may be a Pearson correlation coefficient between histogram $H_{p_1}$ and histogram $H_i$.

Furthermore, under some circumstances, noise on the pixel values may introduce sensitivity to the histogram similarity metric. For example, even if two frames are from the same scene, temporal noise could introduce a difference to a similarity metric. Hence, to improve robustness, embodiments of the systems and methods described herein may apply a smoothing function to one or both of the histograms before determining the similarity metric.

EXAMPLE EMBODIMENTS

Example 1: A computer-implemented method comprising (1) selecting, from a video stream, a reference frame and a current frame, (2) collecting a reference histogram of the reference frame and a current histogram of the current frame, (3) generating a smoothed reference histogram by applying a smoothing function to at least a portion of the reference histogram, (4) determining a similarity metric between the smoothed reference histogram and the current histogram, and (5) when the similarity metric is greater than a threshold value, applying weighted prediction during a motion estimation portion of an encoding of the video stream.

Example 2: The computer-implemented method of example 1, wherein (1) the computer-implemented method further comprises generating a smoothed current histogram from at least a portion of the current histogram, and (2) determining the similarity metric between the smoothed reference histogram and the current histogram comprises determining the similarity metric between the smoothed reference histogram and the smoothed current histogram.

Example 3: The computer-implemented method of any of examples 1-2, wherein collecting the reference histogram comprises (1) determining a weight value and an offset value based on the reference frame and the current frame, and (2) adjusting the reference histogram by applying the weight value and the offset value to the reference histogram.

Example 4: The computer-implemented method of example 3, wherein determining the similarity metric comprises determining the similarity metric based on the adjusted reference histogram and the current histogram.

Example 5: The computer-implemented method of any of examples 1-4, wherein selecting the reference frame and the current frame comprises selecting the reference frame and the current frame during the motion estimation portion of the encoding of the video stream.

Example 6: The computer-implemented method of any of examples 1-5, wherein collecting the reference histogram of the reference frame and the current histogram of the current frame comprises collecting the reference histogram from a YUV plane of the reference frame and the current histogram from a YUV plane of the current frame.

Example 7: The computer-implemented method of any of examples 1-6, wherein determining the similarity metric comprises determining a correlation coefficient between the reference histogram and the current histogram.

Example 8: The computer-implemented method of example 7, wherein determining the correlation coefficient comprises determining a Pearson correlation.

Example 9: The computer-implemented method of any of examples 7-8, wherein determining the correlation coefficient comprises determining at least one of (1) a mutual information metric, (2) an intraclass correlation (ICC), (3) a polychoric correlation, or (4) a rank coefficient.

Example 10: The computer-implemented method of any of examples 1-9, wherein at least one of the reference histogram or the current histogram comprises at least 256 bins.

Example 11: The computer-implemented method of any of examples 1-10, wherein the smoothing function comprises a Gaussian smoothing function.

Example 12: The computer-implemented method of any of examples 1-11, wherein the smoothing function comprises at least one of (1) a nearest-neighbor smoothing function, (2) a wavelet transform function, (3) a barycentric exponential smoothing function, or (4) a mean value smoothing function.

Example 13: The computer-implemented method of any of examples 1-12, wherein the reference histogram comprises at least 256 bins and the current histogram comprises at least 256 bins.

Example 14: A system comprising (1) a selecting module, stored in memory, that selects, from a video stream, a reference frame and a current frame, (2) a collecting module, stored in memory, that collects a reference histogram of the reference frame and a current histogram of the current frame, (3) a smoothing module, stored in memory, that generates a smoothed reference histogram by applying a smoothing function to at least a portion of the reference histogram, (4) a determining module, stored in memory, that determines a similarity metric between the smoothed reference histogram and the current histogram, (5) an applying module, stored in memory, that applies, when the determined similarity metric is greater than a threshold value, weighted prediction during a motion estimation portion of an encoding of the video stream, and (6) at least one physical processor that executes the selecting module, the collecting module, the smoothing module, the determining module, and the applying module.

Example 15: The system of example 14, wherein (1) the collecting module collects the reference histogram by (a) determining a weight value and an offset value based on the reference frame and the current frame, and (b) adjusting the reference histogram by applying the weight value and the offset value to the reference histogram, and (2) the determining module determines the similarity metric by determining the similarity metric based on the adjusted reference histogram and the current histogram.

Example 16: The system of any of examples 14-15, wherein selecting the reference frame and the current frame comprises selecting the reference frame and the current frame during the motion estimation portion of the encoding of the video stream.

Example 17: The system of any of examples 14-16, wherein collecting the reference histogram of the reference frame and the current histogram of the current frame comprises collecting the reference histogram from a YUV plane of the reference frame and the current histogram from a YUV plane of the current frame.

Example 18: The system of any of examples 14-17, wherein determining the similarity metric comprises determining a correlation coefficient between the reference histogram and the current histogram.

Example 19: The system of example 18, wherein determining the correlation coefficient comprises determining a Pearson correlation.

Example 20: A non-transitory computer-readable medium comprising computer-readable instructions that, when executed by at least one processor of a computing system, cause the computing system to (1) select, from a video stream, a reference frame and a current frame, (2) collect a reference histogram of the reference frame and a current histogram of the current frame, (3) generate a smoothed reference histogram by applying a smoothing function to at least a portion of the reference histogram, (4) determine a similarity metric between the smoothed reference histogram and the current histogram, and (5) when the determined similarity metric is greater than a threshold value, apply weighted prediction during a motion estimation portion of an encoding of the video stream.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive video data to be transformed, transform the video data, output a result of the transformation to transcode the video data (e.g., from one resolution and/or bitrate to another resolution and/or bitrate), use the result of the transformation to present transcoded video data to a user, and store the result of the transformation to transcode additional or other video data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    selecting, from a video stream, a reference frame and a current frame;
    collecting a reference histogram of the reference frame and a current histogram of the current frame;
    determining, based on an energy change between the current frame and the reference frame, a weight value;
    adjusting the reference histogram based on the determined weight value;
    generating a smoothed reference histogram by applying a smoothing function to at least a portion of the adjusted reference histogram;
    determining a similarity metric between the smoothed reference histogram and the current histogram; and
    when the similarity metric is greater than a threshold value, applying weighted prediction during a motion estimation portion of an encoding of the video stream.

2. The computer-implemented method of claim 1, wherein:
    the computer-implemented method further comprises generating a smoothed current histogram from at least a portion of the current histogram; and
    determining the similarity metric between the smoothed reference histogram and the current histogram comprises determining the similarity metric between the smoothed reference histogram and the smoothed current histogram.

3. The computer-implemented method of claim 1, further comprising:
    determining an offset value based on the determined weight value; and
    adjusting the reference histogram by applying the offset value to the reference histogram.

4. The computer-implemented method of claim 3, wherein determining the similarity metric comprises determining the similarity metric based on the adjusted reference histogram and the current histogram.

5. The computer-implemented method of claim 1, wherein selecting the reference frame and the current frame comprises selecting the reference frame and the current frame during the motion estimation portion of the encoding of the video stream.

6. The computer-implemented method of claim 1, wherein collecting the reference histogram of the reference frame and the current histogram of the current frame comprises collecting the reference histogram from a YUV plane of the reference frame and the current histogram from a YUV plane of the current frame.

7. The computer-implemented method of claim 1, wherein determining the similarity metric comprises determining a correlation coefficient between the smoothed reference histogram and the current histogram.

8. The computer-implemented method of claim 7, wherein determining the correlation coefficient comprises determining a Pearson correlation.

9. The computer-implemented method of claim 7, wherein determining the correlation coefficient comprises determining at least one of:
 a mutual information metric;
 an intraclass correlation (ICC);
 a polychoric correlation; or
 a rank coefficient.

10. The computer-implemented method of claim 1, wherein at least one of the reference histogram or the current histogram comprises at least 256 bins.

11. The computer-implemented method of claim 1, wherein the smoothing function comprises a Gaussian smoothing function.

12. The computer-implemented method of claim 1, wherein the smoothing function comprises at least one of:
 a nearest-neighbor smoothing function;
 a wavelet transform function;
 a barycentric exponential smoothing function; or
 a mean value smoothing function.

13. The computer-implemented method of claim 1, wherein the reference histogram comprises at least 256 bins and the current histogram comprises at least 256 bins.

14. A system comprising:
 a selecting module, stored in memory, that selects, from a video stream, a reference frame and a current frame;
 a collecting module, stored in memory, that:
  collects a reference histogram of the reference frame and a current histogram of the current frame;
  determines, based on an energy change between the current frame and the reference frame, a weight value; and
  adjusts the reference histogram based on the determined weight value;
 a smoothing module, stored in memory, that generates a smoothed reference histogram by applying a smoothing function to at least a portion of the adjusted reference histogram;
 a determining module, stored in memory, that determines a similarity metric between the smoothed reference histogram and the current histogram;
 an applying module, stored in memory, that applies, when the determined similarity metric is greater than a threshold value, weighted prediction during a motion estimation portion of an encoding of the video stream; and
 at least one physical processor that executes the selecting module, the collecting module, the smoothing module, the determining module, and the applying module.

15. The system of claim 14, wherein:
the collecting module further collects the reference histogram by:
 determining an offset value based on the determined weight value; and
 further adjusting the reference histogram by applying the weight value and the offset value to the reference histogram.

16. The system of claim 14, wherein the selecting module selects the reference frame and the current frame by selecting the reference frame and the current frame during the motion estimation portion of the encoding of the video stream.

17. The system of claim 14, wherein the collecting module collects the reference histogram of the reference frame and the current histogram of the current frame by collecting the reference histogram from a YUV plane of the reference frame and the current histogram from a YUV plane of the current frame.

18. The system of claim 14, wherein the determining module determines the similarity metric by determining a correlation coefficient between the reference histogram and the current histogram.

19. The system of claim 18, wherein the determining module determines the correlation coefficient by determining a Pearson correlation.

20. A non-transitory computer-readable medium comprising computer-readable instructions that, when executed by at least one processor of a computing system, cause the computing system to:
 select, from a video stream, a reference frame and a current frame;
 collect a reference histogram of the reference frame and a current histogram of the current frame;
 determine, based on an energy change between the current frame and the reference frame, a weight value;
 adjust the reference histogram based on the determined weight value;
 generate a smoothed reference histogram by applying a smoothing function to at least a portion of the reference histogram;
 determine a similarity metric between the smoothed reference histogram and the current histogram; and
 when the determined similarity metric is greater than a threshold value, apply weighted prediction during a motion estimation portion of an encoding of the video stream.

* * * * *